(12) United States Patent
Yang

(10) Patent No.: US 7,996,540 B2
(45) Date of Patent: Aug. 9, 2011

(54) METHOD AND SYSTEM FOR REPLACING MEDIA STREAM IN A COMMUNICATION PROCESS OF A TERMINAL

(75) Inventor: Jian Yang, Guangdong Province (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 772 days.

(21) Appl. No.: 11/805,547

(22) Filed: May 23, 2007

(65) Prior Publication Data

US 2007/0274344 A1 Nov. 29, 2007

(30) Foreign Application Priority Data

May 26, 2006 (CN) .......................... 2006 1 0080978

(51) Int. Cl.
*G06F 15/16* (2006.01)
(52) U.S. Cl. ...................................... 709/227
(58) Field of Classification Search ................. 709/250, 709/227; 370/486, 477, 389
See application file for complete search history.

(56) References Cited

U.S. PATENT DOCUMENTS

| | | | | |
|---|---|---|---|---|
| 7,788,585 B2 * | 8/2010 | Ubillos | ........................ | 715/723 |
| 2007/0180135 A1 * | 8/2007 | Kenrick et al. | ............... | 709/231 |
| 2008/0107108 A1 * | 5/2008 | Bouazizi | ...................... | 370/389 |
| 2008/0195761 A1 * | 8/2008 | Jabri et al. | .................... | 709/250 |
| 2008/0267218 A1 * | 10/2008 | Linnamaki et al. | ........... | 370/477 |

FOREIGN PATENT DOCUMENTS

| | | |
|---|---|---|
| CN | 1372416 A | 10/2002 |
| CN | 1527601 | 9/2004 |
| CN | 1592281 A | 3/2005 |
| CN | 1671160 | 9/2005 |
| CN | 1738267 A | 2/2006 |
| CN | 100493038 | 5/2009 |
| EP | 1 631 084 A2 | 3/2006 |
| EP | 1 742 437 A1 | 1/2007 |

(Continued)

OTHER PUBLICATIONS

Improving n-gram models by incorporating enhanced distributions, O'Boyle, P.; Ming, J.; McMahon, J.; Smith, F.J.; Acoustics, Speech, and Signal Processing, 1996. ICASSP-96. Conference Proceedings., 1996 IEEE International Conference on vol. 1 Digital Object Identifier: 10.1109/ICASSP.1996.540317 Publication Year: 1996, pp. 168-171.*

(Continued)

*Primary Examiner* — Michael Holmes
(74) *Attorney, Agent, or Firm* — Finnegan, Henderson, Farabow, Garrett & Dunner LLP

(57) ABSTRACT

A method and a system for replacing media stream in a communication process of a terminal are disclosed. The method includes: a terminal issuing a request for replacing media stream to a communication server in a communication process; the communication server obtaining a corresponding replacing media source from a multimedia server according to a replacing media source identification carried in the request for replacing media stream, and replacing media stream sent by the terminal with the replacing media source. The system includes a multimedia server and a communication server. According to the embodiments of the present invention, a terminal participating in a communication process may replace its own voice and/or pictures with stored audio and/or video and/or data, so as to provide a new value-added service and bring new service revenue for operators.

16 Claims, 6 Drawing Sheets

FOREIGN PATENT DOCUMENTS

| WO | 02/17591 A | 2/2002 |
|---|---|---|
| WO | 03/010986 A | 2/2003 |
| WO | 2005/041491 A1 | 5/2005 |
| WO | WO 2006/023961 | 3/2006 |
| WO | 2007/095238 A2 | 8/2007 |

OTHER PUBLICATIONS

A media conversion from speech to facial image for intelligent man-machine interface, Morishima, S.; Harashima, H.; Selected Areas in Communications, IEEE Journal on vol. 9 , Issue: 4 Digital Object Identifier: 10.1109/49.81953 Publication Year: 1991 , pp. 594-600.*

Statistical parsing based on Maximal Noun Phrase pre-processing, Qiaoli Zhou; Yue Gu; Xin Liu; Wenjing Lang; Dongfeng Cai; Natural Language Processing and Knowledge Engineering (NLP-KE), 2010 International Conference on Digital Object Identifier: 10.1109/NLPKE.2010.5587850 Publication Year: 2010 , pp. 1-7.*

Integration of concept-driven semantic interpretation with speech recognition, Nagai, A.; Ishikawa, I.; Nakajima, K.; Acoustics, Speech, and Signal Processing, 1996. ICASSP-96. Conference Proceedings., 1996 IEEE International Conference on vol. 1 Digital Object Identifier: 10.1109/ICASSP.1996.541125 Publication Year: 1996 , pp. 431-434.*

PCT International Preliminary Report on Patentability enclosing an English translation of the Written Opinion of the International Searching Authority for international application No. PCT/CN2007/000372, mailed May 24, 2007, 5 pgs.

First Chinese Office Action issued by the State Intellectual Property Office of the PRC for application No. 200780000298.4,mailed Apr. 14, 2010, 8 pgs., partial English translation attached.

* cited by examiner

METHOD AND SYSTEM FOR REPLACING MEDIA STREAM IN A COMMUNICATION PROCESS OF A TERMINAL

The present application claims the priority of Chinese Patent Application No. 200610080978.9, filed on May 26, 2006, entitled "METHOD AND SYSTEM FOR REPLACING MEDIA STREAM IN A COMMUNICATION PROCESS OF A TERMINAL", which is incorporated herein by reference in its entirety.

FIELD OF THE INVENTION

The present invention relates to the field of communication technology, and more particularly to a method and a system for replacing media stream in a communication process of a terminal.

BACKGROUND OF THE INVENTION

With the maturity of the 3G technology and products, the deployment and service of 3G networks increase significantly throughout the world. As an advanced service with full characteristics of the 3G communication service, the mobile video phone service is becoming a reality with the arrival of the 3G service.

As communication, computer, voice and video encoding and decoding technology develop, the Video Phone (VP) develops rapidly. The VP integrates voice, image and data etc. for long distance transmission via communication lines, so that a person may hear the other party's voice and see the other party's image in communication between two places, thereby enhancing the reality, intimacy and on-site perception of communication. The VP is suitable for not only family life but also various fields of different industries, such as commercial activity, remote teaching, security monitoring, hospital nursing and medical diagnosis, thus the VP has wide market prospect.

The mobile video phone service based on video mobile terminal is a point-to-point communication service which may simultaneously utilize audio and video defined in the Universal Mobile Telecommunication System (UMTS), which may implement bidirectional real-time communication of audio and video between two video mobile terminals, or between a video mobile terminal and a video fixed terminal or between a video mobile terminal and a PC. In contrast with the conventional mobile phone service, the development of the mobile video phone service is a great challenge for system providers and mobile network operators due to the limit of bandwidth, cost, equipment and service.

At present, though large-scale commercial deployment of the VP service has not begun in a 3G network, the recognition and expectation for the mobile video phone service is very high, and the mobile video phone service will facilitate the development of 3G networks.

At present, a function of a video mobile terminal replacing its own voice or picture with a local audio or video file of the terminal in a communication process has been realized. By applying this function in communication between two or more parties, video mobile terminals participating in the communication may replace their voice and/or pictures with pre-stored audio and/or video media stream as needed and send the media stream to other terminals participating in the communication so that the other terminals may receive the replaced audio and/or video etc. multimedia information. In such an application, the replacing media stream is provided by the video mobile terminal originating the media stream replacing, so there are limitations such as limits on storage capacity and selectivity, etc. Operators are unable to launch a charge service for the application because the replacing process does not need the intervention of a server.

SUMMARY OF THE INVENTION

One or more embodiments of the present invention provides a method and a system for replacing media stream in a communication process of a terminal, in which voice and/or pictures of the terminal may be replaced with an audio and/or video file stored by the terminal.

An embodiment of the present invention provides a method for replacing media stream in a communication process of a terminal, including: receiving, by a communication server, a request for replacing media stream carrying a replacing media source identification from a terminal in a communication process; obtaining a corresponding replacing media source from a multimedia server according to the replacing media source identification carried in the request for replacing media stream; replacing media stream sent by the terminal with the replacing media source.

An embodiment of the present invention provides a system for replacing media stream, including: a multimedia server configured for providing a replacing media source for a terminal; a communication server configured for receiving a request for replacing media stream issued by the terminal in a communication process, obtaining the corresponding replacing media source from the multimedia server according to a replacing media source identification carried in the request for replacing media stream, and replacing media stream sent by the terminal issuing the request for replacing media stream with the replacing media source.

An embodiment of the present invention provides a communication server, including: an exchange unit configured for receiving and forwarding media stream sent by a terminal; an interoperability gateway configured for receiving the media stream forwarded by the exchange unit; wherein the exchange unit is further configured to receive a request for replacing media stream issued by the terminal and send the request to the interoperability gateway, the interoperability gateway is further configured to obtain a corresponding replacing media source from a multimedia server according to the request for replacing media stream, send the replacing media source to the exchange unit, the exchange unit is further configured to replace the media stream sent by the terminal with the replacing media source and send the replacing media source to terminals participating in a communication process.

An embodiment of the present invention provides another communication server, including: an exchange unit configured for receiving and forwarding media stream sent by a terminal and a request for replacing media stream issued by the terminal; an interoperability gateway configured for receiving the media stream forwarded by the exchange unit, and converting the media stream so as to be sent; a multi-point control unit for receiving media stream resulting from the conversion process sent by the interoperability gateway; the exchange unit is further configured to receive a request for replacing media stream issued by the terminal and send the request to the multi-point control unit through the interoperability gateway, the multi-point control unit is further configured to obtain a corresponding replacing media source from a multimedia server according to the request for replacing media stream issued by the terminal, replace the media stream sent by the terminal with the replacing media source and send the replacing media source to terminals participating in a communication process.

An embodiment of the present invention provides a multimedia terminal, including: a media stream requesting unit configured for sending a request for replacing media stream; a receiving unit configured for receiving replaced media stream sent by a server; an output unit configured for outputting the replaced media stream received by the receiving unit.

In the technical solution provided in one or more embodiments of the present invention, in a communication process between two or more parties, a video terminal may select a replacing media source provided by a multimedia server for other terminals participating in the video communication to replace its own audio and/or video with the replacing media source while the current communication connection is not interrupted. Thus, there is no limitation of the storage capacity of the terminal, media sources available to be selected are abundant, and different requirements of users may be further met, so as to provide a new value-added service and bring new service revenue for operators.

BRIEF DESCRIPTIONS OF THE DRAWINGS

DETAILED DESCRIPTIONS OF THE EMBODIMENTS

In one or more embodiments of the present invention, by arranging a multimedia server for storing replacing media sources at network side, when a terminal issues a request for replacing media stream, a corresponding replacing media source is obtained from the multimedia server and used to replace media stream sent by the terminal. Thus, there is no limitation of the storage capacity of the terminal, media sources available to be selected are abundant, and different requirements of users may be further met.

Hereinafter, the particular embodiments of the present invention will be described in detail with reference to the accompanying drawings.

Figure 1:
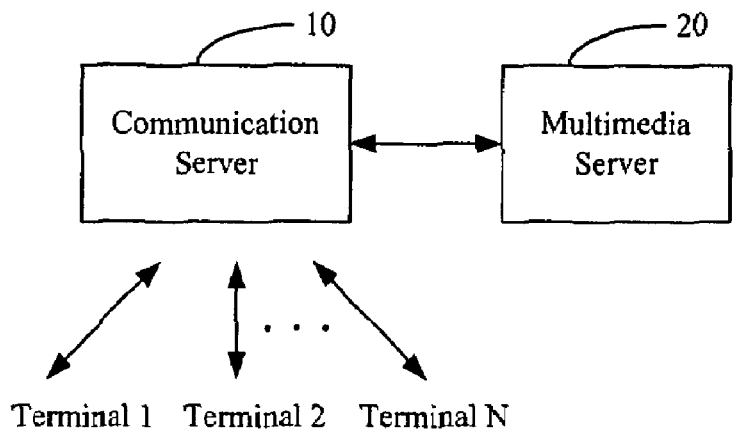
FIG. 1 is a simplified block diagram of a main structure of a system according to an embodiment of the present invention.

FIG. 1 is a structural block diagram of a system for replacing media stream according to an embodiment of the present invention, the system mainly includes a communication server 10 and a multimedia server 20.

The communication server 10 is configured for receiving a request for replacing media stream issued by the terminal in a communication process, and obtaining the corresponding replacing media source from the multimedia server 20 according to a replacing media source identification carried in the request, and replacing media stream sent by the terminal issuing the request with the replacing media source.

The multimedia server 20 communicates with the communication server 10, and is configured for storing and providing the replacing media source.

Figure 2:
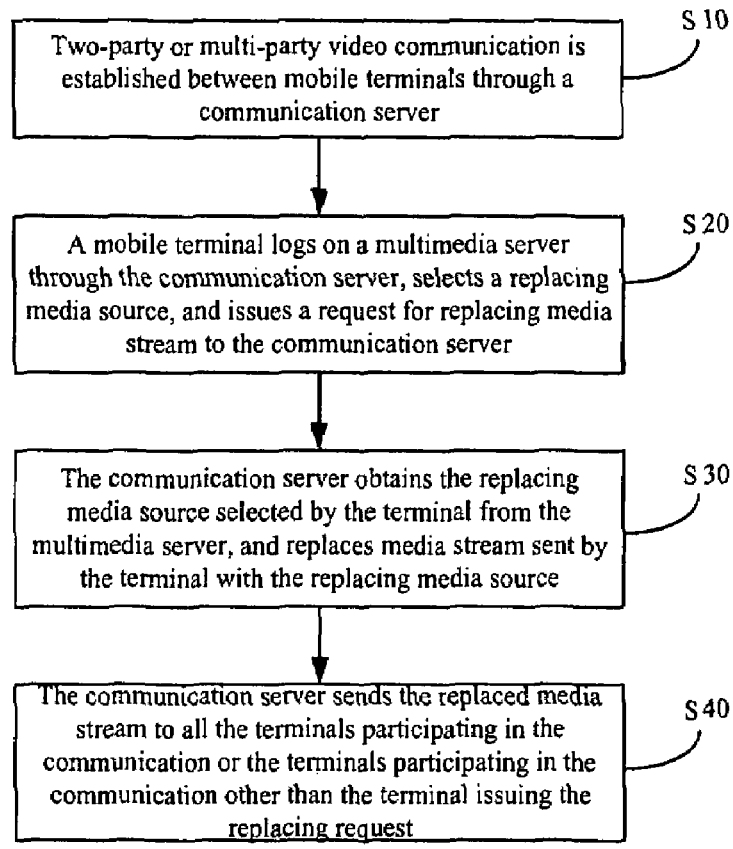
FIG. 2 is a simplified flow chart of a method for replacing media stream in a communication process of a terminal according to an embodiment of the present invention.

By applying the above system, an embodiment of the present invention provides a method for replacing media stream in a communication process of a terminal. With reference to FIG. 2, the processing procedure of the method for replacing media stream in a communication process of a terminal includes:

In block S10, a two-party or multi-party video communication is established between mobile terminals through a communication server.

In block S20, a mobile terminal logs on a multimedia server through the communication server, selects a replacing media source for replacing audio and/or video media stream sent by the mobile terminal itself via navigation media stream provided by the multimedia server, and issues a request for replacing media stream to the communication server.

In block S30, the communication server obtains a corresponding replacing media source from the multimedia server according to a replacing media source identification carried in the request for replacing media stream, and replaces media stream sent by the terminal with the replacing media source.

In the embodiment of the present invention, the communication server replaces the media stream sent by the terminal with the obtained replacing media source in two ways:

1: the communication server simultaneously replaces the audio and video media stream sent by the terminal with the replacing media source obtained from the multimedia server;

2: the communication server replaces a corresponding part of the media stream sent by the terminal according to the type of the replacing media source obtained from the multimedia server.

In block S40, the communication server sends the replaced media stream to all the terminals participating in the communication or the terminals participating in the communication other than the terminal issuing the replacing request.

Figure 3:
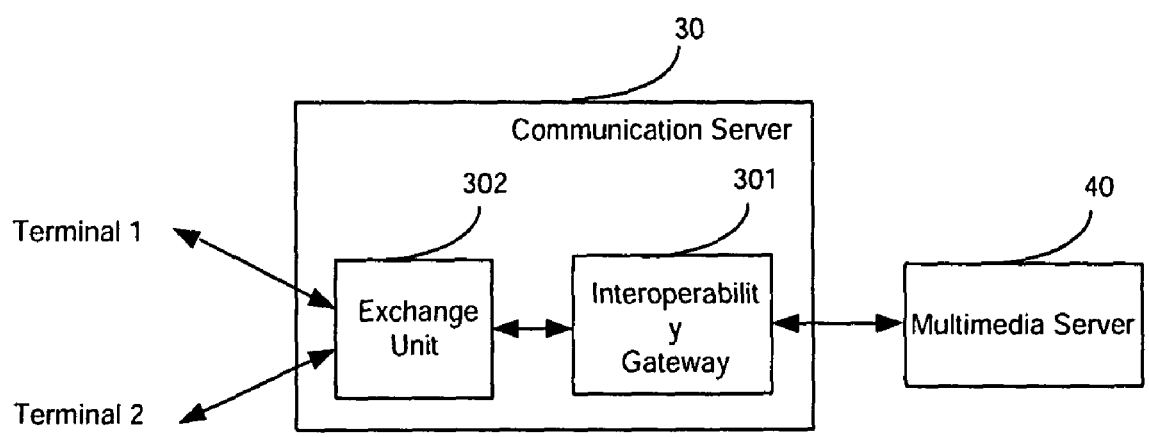
FIG. 3 is a simplified structural block diagram of a system for replacing media stream according to an embodiment of the present invention.

Hereinafter, the particular implementation of an embodiment of the present invention will be described in detail with an example of two-party video communication and an example of multi-party video communication respectively. With reference to FIG. 3, a system for replacing media stream in a two-party communication process of a video terminal according to an embodiment of the present invention mainly includes a communication server 30 and a multimedia server 40. The multimedia server 40 communicates with the communication server 30, and is configured for storing and providing the replacing media source.

The communication server 30 is configured for receiving a request for replacing media stream issued by a terminal in a video communication process, obtaining a corresponding replacing media source from the multimedia server 40 according to a replacing media source identification carried in the request, and replacing media stream sent by the terminal issuing the request for replacing media stream with the replacing media source.

The communication server 30 further includes:

an interoperability gateway 301 configured for obtaining a corresponding replacing media source from the multimedia server according to the request for replacing media stream issued by the terminal, converting the obtained replacing media source into circuit domain data, and sending the data to an exchange unit 302 after a corresponding conversion of control protocol and data format, the exchange unit 302 configured for sending the media stream sent by the terminal and the request for replacing media stream issued by the terminal to a video interoperability gateway 301, and receiving the replaced media stream sent by the video interoperability gateway 301, sending the replaced media stream to all the terminals participating in the communication or the terminals participating in the communication other than the terminal issuing the replacing request.

Figure 4:
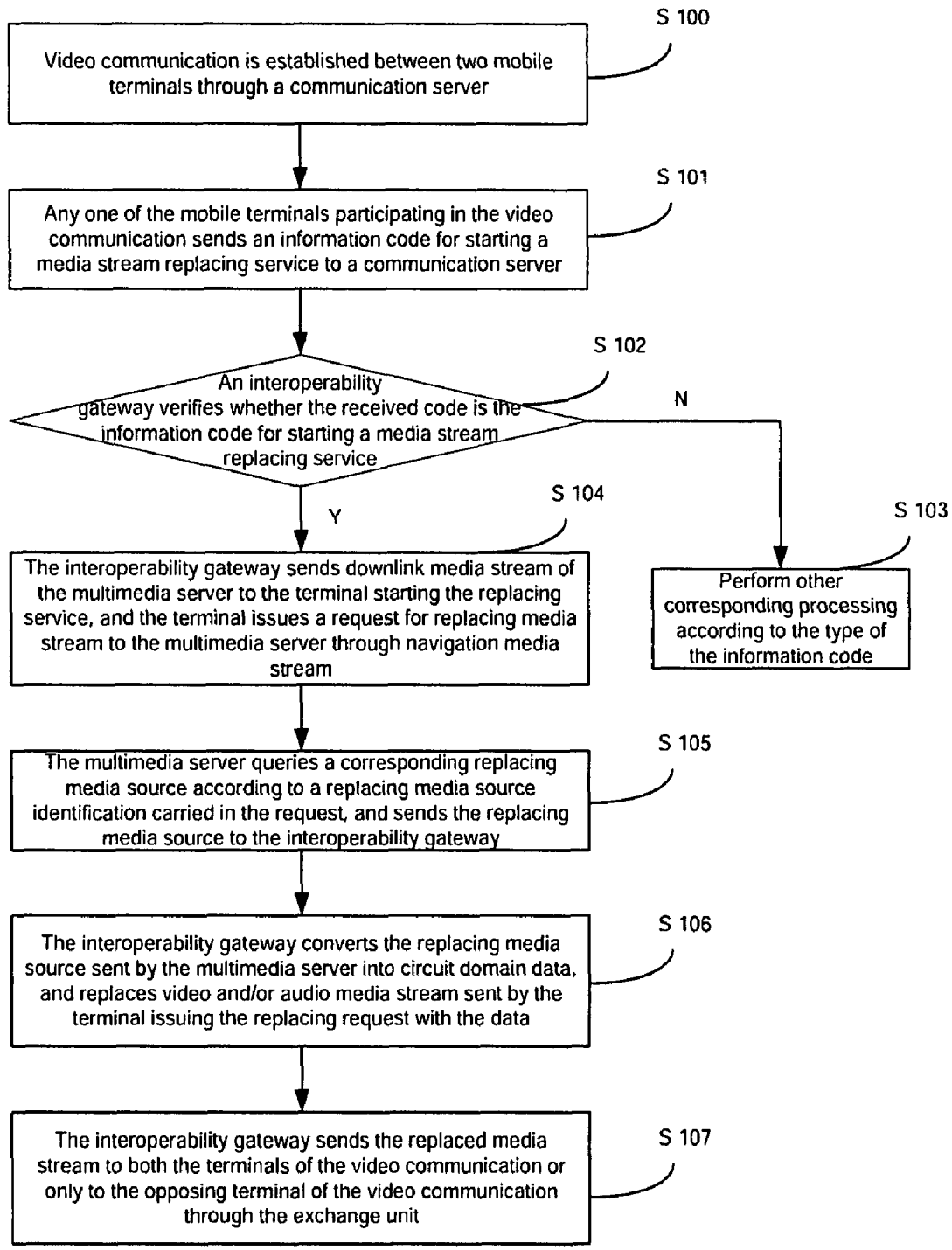
FIG. 4 is a simplified flow chart of a method for replacing media stream according to an embodiment of the present invention.

Corresponding to the system for replacing media stream according to the embodiment, a method for replacing media stream in a two-party communication process of a video terminal is further provided herein. FIG. 4 is a simplified flow chart showing the processing procedure of the method for replacing media stream in a two-party communication process of a video terminal according to an embodiment of the present invention, the method includes:

In block S100, a video communication is established between two mobile terminals through a communication server.

In block S101, any one of the mobile terminals participating in the video communication sends an information code for starting a media stream replacing service, e.g., "186#*#", to the communication server by pressing keys.

In block S102, upon receiving the information code sent by the terminal, a video interoperability gateway in the communication server verifies whether the code is the information code for starting a media stream replacing service, if so, the process in block S104 is performed; otherwise, the process in block S103 is performed.

In block S103, the video interoperability gateway performs other corresponding process according to the type of the information code.

In block S104, the video interoperability gateway in the communication server communicates with the multimedia server, converts downlink media stream of the multimedia server into circuit domain data, and sends the data to the terminal starting the replacing service through an exchange unit. The terminal receives navigation media stream for replacing operation provided by the multimedia server, selects a replacing media source through the navigation media stream, and issues a request for replacing media stream to the multimedia server through the communication server, the identification of the replacing media source selected by a user being carried in the request.

In block S105, upon receiving the request for replacing media stream issued by the terminal, the multimedia server searches a corresponding replacing media source according to the replacing media source identification carried in the request, and sends the searched replacing media source to the video interoperability gateway;

The replacing media source stored in the multimedia server is audio media stream, video media stream, or both audio and video media stream.

In block S106, the video interoperability gateway in the communication server converts the replacing media source sent by the multimedia server into circuit domain data, and performs a corresponding conversion of control protocol and data format, and replaces video and/or audio media stream sent by the terminal issuing the replacing request with the converted data.

In this embodiment, the video interoperability gateway replaces the media stream sent by the terminal with the obtained replacing media source in an alternative way:

the first way: the video interoperability gateway simultaneously replaces the audio and video media stream sent by the terminal with the replacing media source obtained from the multimedia server, or the second way: the video interoperability gateway replaces a corresponding part of the media stream sent by the terminal according to the type of the replacing media source obtained from the multimedia server.

In block S107, the video interoperability gateway sends the converted media stream and control stream to the exchange unit. The exchange unit replaces the media stream and sends it to the two terminals of the video communication, or only to the opposing terminal of the video communication;

When the exchange unit sends the replaced media stream to both the terminals of the video communication, the two terminals of the video communication may receive the replaced media stream. When the exchange unit sends the replaced media stream only to the opposing terminal of the video communication, the terminal issuing the replacing request may receive the audio and video media stream sent by the opposing terminal, or receive the navigation media stream for replacing operation sent by the multimedia server.

When the video interoperability gateway replaces the media stream sent by the terminal in the first way in the process in block S106, the terminal only receives the replaced media stream.

When the video interoperability gateway replaces the media stream sent by the terminal in the second way in the process in block S106, if the replacing media source is media stream in the form of both audio and video, correspondingly, the terminal receives the replacing media stream in the form of both audio and video. If the replacing media source is media stream in the form of audio, correspondingly, the terminal receives the replacing media stream in the form of audio, and receives the video media stream sent by the opposing terminal. If the replacing media source is media stream in the form of video, correspondingly, the terminal receives the replacing media stream in the form of video and the audio media stream sent by the opposing terminal.

In this embodiment, any one of the two terminals in the communication may requests for halting media stream replacing in the two-party communication process by sending a request for halting media stream replacing to the video interoperability gateway.

Figure 5:
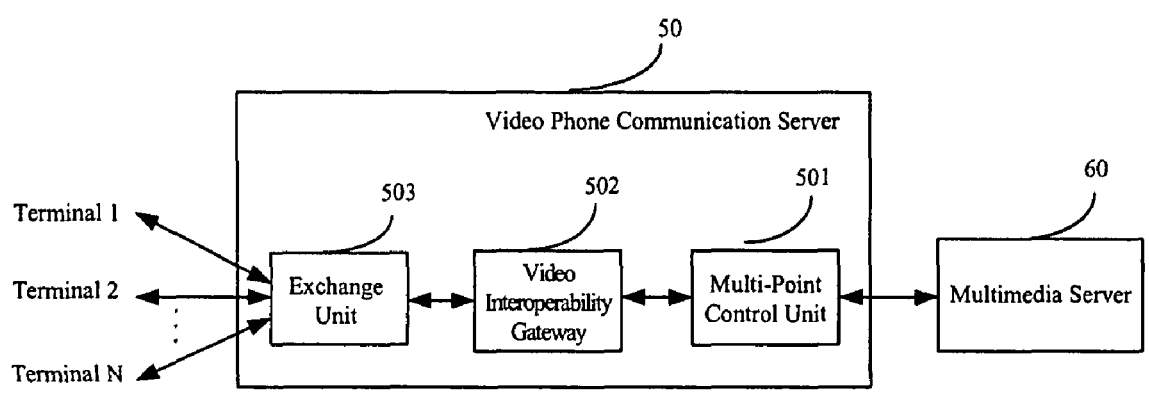
FIG. 5 is a simplified structural block diagram of a system for replacing media stream according to an embodiment of the present invention.

With reference to FIG. 5, a system for replacing media stream in a multi-party communication process of a video terminal according to an embodiment of the present invention includes a video phone communication server 50 and a multimedia server 60.

The multimedia server 60 communicates with the video phone communication server 50, and is configured for storing and providing the replacing media source.

The video phone communication server 50 is configured for receiving a request for replacing media stream issued by a terminal in a video communication process, obtaining a corresponding replacing media source from the multimedia server 60 according to a replacing media source identification carried in the request, and replacing media stream sent by the terminal issuing the replacing request with the replacing media source. The video phone communication server 50 further includes:

a multi-point control unit 501 configured for controlling the multi-party communication, obtaining a corresponding replacing media source from the multimedia server according to the request for replacing media stream issued by the terminal, and replacing the media stream sent by the terminal with the replacing media source, a video interoperability gateway 502 configured for converting the media stream sent by the terminal into packet domain data, and sending the data to the multi-point control unit 501, and receiving the replaced media stream from the multi-point control unit 501 and converting it into circuit domain data, and an exchange unit 503 configured for sending the media stream sent by the terminal and the request for replacing media stream issued by the terminal to the video interoperability gateway 502, and receiving the replaced media stream sent by the video interoperability gateway 502, sending the replaced media stream to all the terminals participating in the communication or the terminals participating in the communication other than the terminal issuing the replacing request.

The exchange unit described in other embodiments of the present invention is not limited to a CS domain exchange unit, and it also may be an IMS domain exchange unit or other exchange units.

Figure 6:
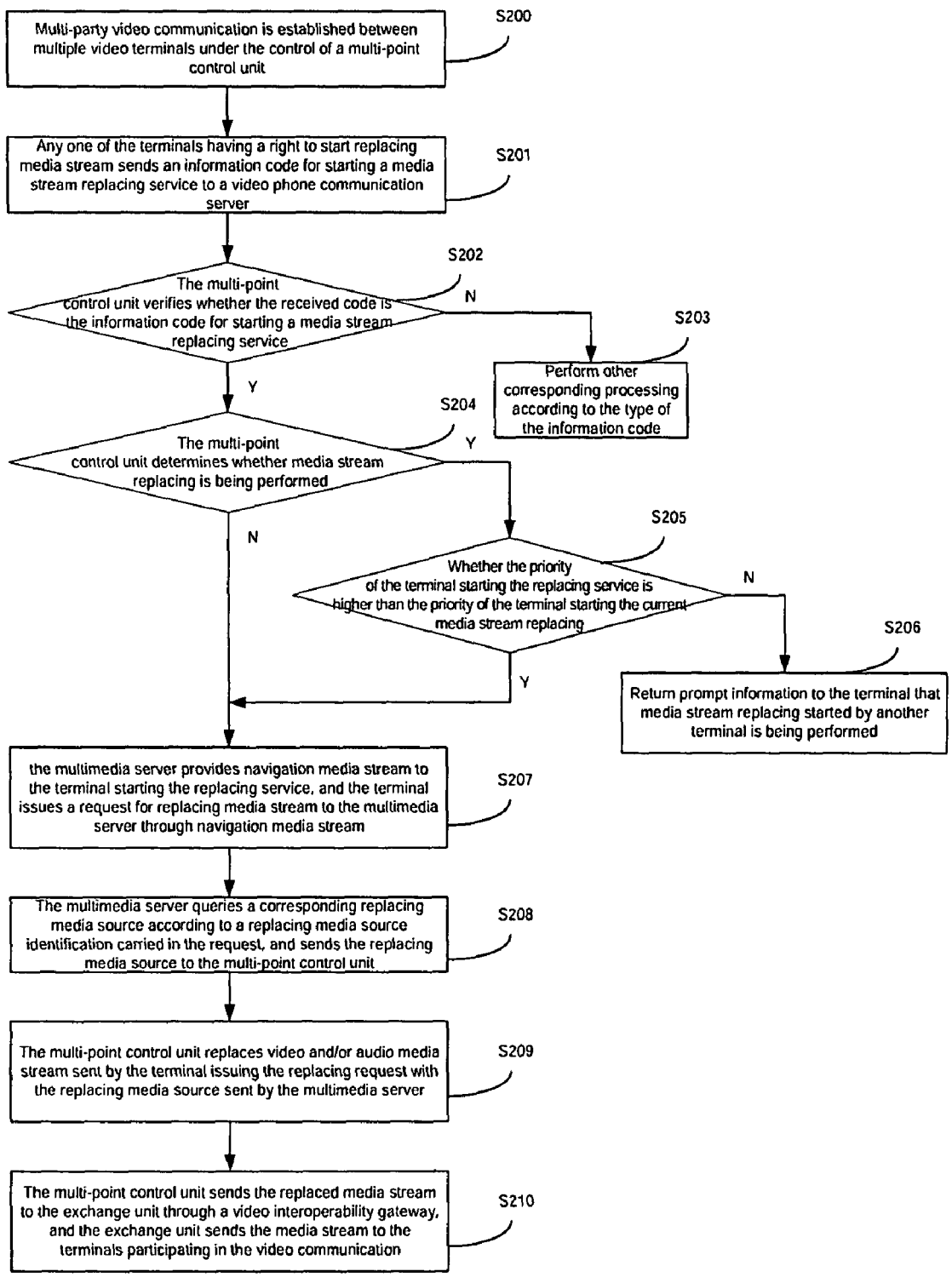
FIG. 6 is a simplified flow chart of a method for replacing media stream in a multi-party communication process of a video terminal according to an embodiment of the present invention.

Corresponding to the system for replacing media stream according to this embodiment, a method for replacing media stream in a multi-party communication process of a video terminal is further provided herein. With reference to FIG. 6, the method for replacing media stream in a multi-party communication process of a video terminal according to an embodiment of the present invention includes:

In block S200, multi-party video communication is established between multiple video terminals under the control of a multi-point control unit in a video phone communication server.

In block S201, an information code for starting a media stream replacing service, e.g., "186#*#", may be sent to the video phone communication server by pressing keys at any one of the terminals having a right to start replacing media stream.

In block S202, whether the information code for starting a media stream replacing service is valid is verified, by the multi-point control unit, in response to receiving the information code sent by the terminal, if so, the process in block S204 is performed; otherwise, the process in block S203 is performed.

In block S203, a corresponding process is performed, according to the type of the information code by the multi-point control unit.

In block S204, the multi-point control unit determines whether a media stream replacing process is being performed, if so, the process in block S205 is performed; otherwise, the process in block S207 is performed.

In block S205, the multi-point control unit determines whether the priority of the terminal issuing the request for starting the replacing service is higher than the priority of the terminal starting the current media stream replacing process, if so, the multi-point control unit halts the current media stream replacing process and the process in block S207 is performed; otherwise, the process in block S206 is performed.

In block S206, the multi-point control unit declines the request for starting the media stream replacing service issued by the terminal through an exchange unit, and returns prompt information that a media stream replacing process started by another terminal having a higher priority is being performed, to the terminal.

In block S207, the multi-point control unit communicates with a multimedia server, and the multimedia server provides navigation media stream for replacing operation to the terminal. The terminal may select a media source through the navigation media stream, and send a request for replacing media stream to the multimedia server through the video phone communication server. The identification of the replacing media source selected by a user may be carried in the request.

In block S208, in response to receiving the request for replacing media stream issued by the terminal, the multimedia server searches a corresponding replacing media source according to the identification carried in the request, and sends the replacing media source to the multi-point control unit.

The replacing media source stored in the multimedia server is audio media stream, or video media stream, or both audio and video media stream.

In block S209, the multi-point control unit replaces video and/or audio media stream sent by the terminal issuing the replacing request with the replacing media source sent by the multimedia server.

In this embodiment, the multi-point control unit replaces the media stream sent by the terminal with the obtained replacing media source in the same way as described in block S106 of the above embodiment, which will not be described any more.

In block S210, the multi-point control unit sends the replaced media stream to the video interoperability gateway. The video interoperability gateway converts the replaced media stream into circuit domain data and sends the data to the exchange unit. The exchange unit sends the replaced media stream simultaneously to all the terminals participating in the video communication or the terminals participating in the video communication other than the terminal issuing the replacing request.

When the exchange unit sends the replaced media stream simultaneously to all the terminals participating in the video communication, all the terminals participating in the video communication may receive the replaced media stream. When the exchange unit sends the replaced media stream to the terminals participating in the video communication other than the terminal issuing the replacing request, the terminal issuing the replacing request receives the navigation media stream for replacing operation sent by the multimedia server.

Figure 7:
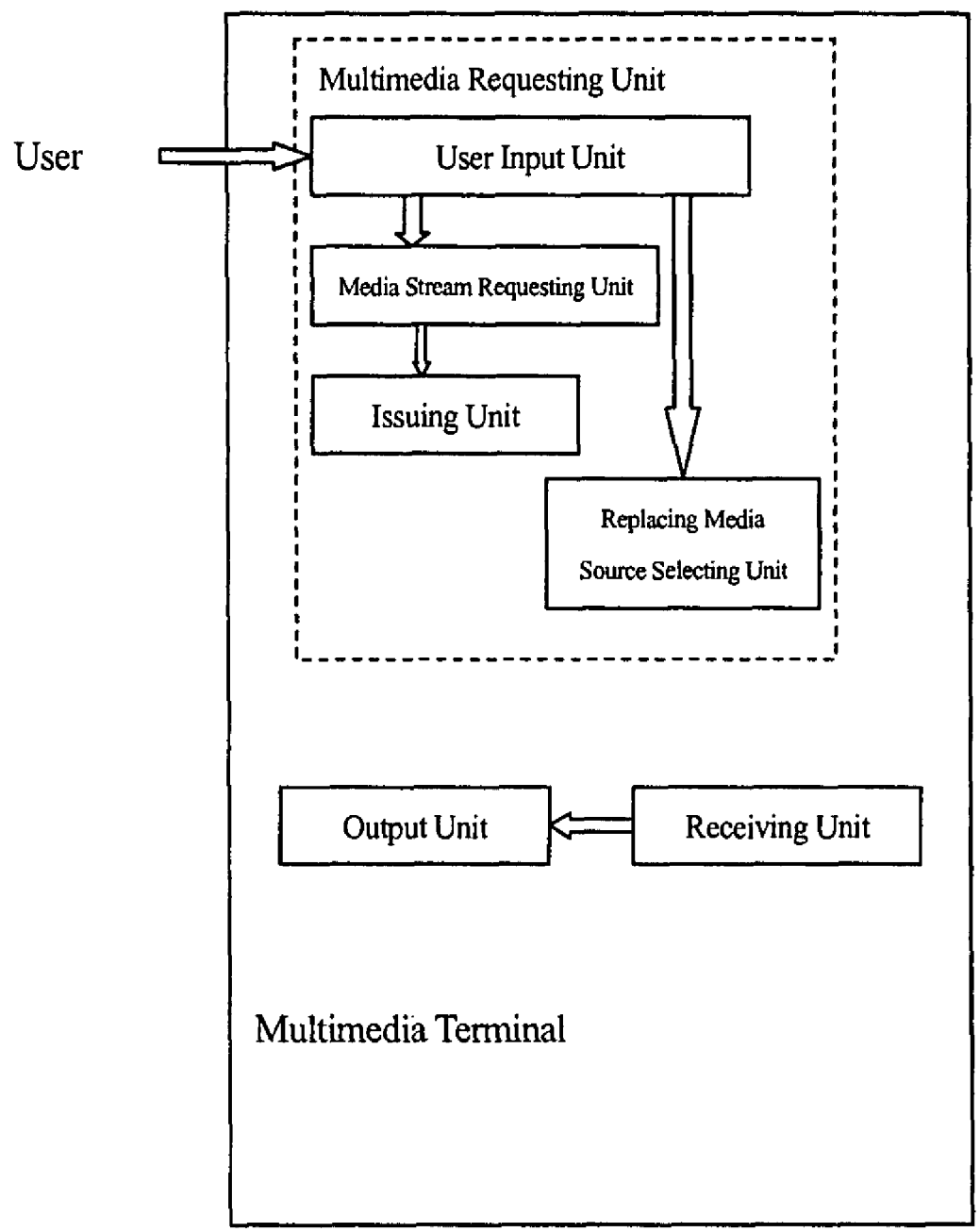
FIG. 7 is a simplified structural diagram of a multimedia terminal according to an embodiment of the present invention.

With reference to FIG. 7, an embodiment of the present invention also provides a multimedia terminal, including: a media stream requesting unit for sending a request for replacing media stream; a receiving unit for receiving the replaced media stream sent by a server; and an output unit for outputting the replaced media stream received by the receiving unit.

The media stream requesting unit further includes: a user input unit for receiving a user instruction; a media stream replacing request generating unit for generating a request for replacing media stream according to the user instruction; and an issuing unit for issuing the request for replacing media stream to network side.

The media stream requesting unit further includes: a replacing media source selecting unit for selecting a replacing media source according to navigation media stream for replacing operation provided by the network side.

According to the embodiments of the present invention, in a two-party or multi-party communication process, a video terminal may select a replacing media source provided by a multimedia server for other terminals participating in the video communication to replace audio and/or video media stream of the video terminal with the replacing media source while the current communication is not interrupted, so as to provide a new value-added service and bring new service revenue for operators.

Apparently, those skilled in the art may make various modifications and variations to the present invention without departing from the spirit and scope of the present invention. Thus, the present invention is intended to cover those modifications and variations if they fall within the scope of the claims of the present invention and equivalents thereof.

What is claimed is:

1. A method for use by a communication server to replace a first media stream in a communication process, comprising:
receiving a request for replacing the first media stream from a terminal participating in the communication process, said request carrying a replacing media source identification;
obtaining a second media stream from a multimedia server according to the replacing media source identification carried in the request for replacing the first media stream;
replacing the first media stream with the second media stream to obtain a replaced media stream; and
sending the replaced media stream to another terminal participating in the communication process;
wherein the first media stream is sent from the terminal to the other terminal before the first media stream is replaced with the second media stream during the communication process.

2. The method according to claim 1, wherein the communication process is a two-party communication process, and the receiving a request for replacing the first media stream from the terminal comprises:
receiving a request for starting a media stream replacing service from the terminal;
forwarding the request for starting the media stream replacing service to the multimedia server;
sending to the terminal a navigation media stream, said navigation media stream being provided by the multimedia server for the terminal to select a replacing media source; and
receiving the request for replacing the media stream, wherein the replacing media source identification carried in the request corresponds to a replacing media source selected by the terminal.

3. The method according to claim 1, wherein the communication process is a multi-party communication process, and the receiving a request for replacing the first media stream from the terminal comprises:
receiving a request for starting a media stream replacing service from the terminal;
determining whether to accept the request for starting the media stream replacing service according to a priority of the terminal;
if it is determined to accept the request for starting the media replacing service, forwarding the request for starting the media stream replacing service to the multimedia server;
sending to the terminal a navigation media stream for the terminal to select a replacing media source, said navigation stream being provided by the multimedia server, and
receiving the request for replacing the media stream, wherein the replacing media source identification carried in the request corresponds to a replacing media source selected by the terminal.

4. The method according to claim 1, wherein if the communication process is a two-party communication process, the terminal starting a media stream replacing service is either one of the two terminals in the two-party communication process; and
if the communication process is a multi-party communication process, the terminal starting the media stream replacing service is a terminal having a right to start the media stream replacing service in the multi-party communication process.

5. The method according to claim 1, wherein the replacing media source is one or more of audio, video and data.

6. The method according to claim 5, wherein, replacing the first media stream sent from the terminal to another terminal with the second media stream comprises:
replacing the first media stream sent from the terminal to the other terminal with the second media stream obtained from the multimedia server, wherein the first media stream or the second media stream is one or both of an audio and a video media stream.

7. The method according to claim 5, wherein, replacing the first media stream sent from the terminal to another terminal with the second media stream comprises:
replacing a corresponding part of the first media stream sent from the terminal to the other terminal according to a type of the replacing media source obtained from the multimedia server.

8. The method according to claim 1, further comprising:
sending the replaced media stream to all terminals participating in the communication process or the terminals participating in the communication process other than the terminal issuing the request for replacing the media stream.

9. A system for replacing a first media stream in a communication process, comprising:
a multimedia server, configured to provide a replacing media stream to a terminal participating in the communication process; and
a communication server, configured to:
receive a request for replacing the first media stream from the terminal,
obtain a corresponding second media stream from the multimedia server according to a replacing media source identification carried in the request for replacing the first media stream,
replace the first media stream with the second media stream to obtain a replaced media stream, and
send the replaced media stream to another terminal participating in the communication process;
wherein the first media stream is sent from the terminal to the other terminal before the communication server replaces the first media stream with the second media stream during the communication process.

10. The system according to claim 9, wherein the communication process is a two-party communication process, and the communication server comprises:
an exchange unit, configured to receive and forward the first media stream sent by the terminal, and receive and forward the request for replacing the first media stream from the terminal; and
an interoperability gateway, configured to receive the first media stream forwarded by the exchange unit, receive the request for replacing the first media stream forwarded by the exchange unit, obtain the second media stream from the multimedia server according to the replacing media source identification carried in the request for replacing the first media stream, and send the second media stream to the exchange unit;
wherein the exchange unit is further configured to receive the second media stream and replace the first media stream sent by the terminal with the replacing media stream to obtain the replaced media stream, and send the replaced media stream to the other terminal participating in the communication process.

11. The system according to claim 9, wherein the communication process is a two-party communication process, and the communication server comprises:

an exchange unit, configured to receive and forward the first media stream sent by the terminal, and receive and forward a request for starting a media stream replacing service from the terminal; and an interoperability gateway, configured to receive a navigation media stream from the multimedia server, convert the navigation media stream into circuit domain data, and forward the circuit domain data to the terminal starting the media stream replacing service through the exchange unit;

wherein the exchange unit is further configured to receive the request for replacing the first media stream issued by the terminal and send the request to the interoperability gateway, the interoperability gateway is further configured to obtain the second media stream from the multimedia server according to the replacing media source identification carried in the request for replacing the first media stream, and the exchanged unit is further configured to replace the first media stream sent by the terminal with the second media stream to obtain the replaced media stream, and send the replaced media stream to the two terminals participating in the communication process or other terminal participating in the communication process.

12. The system according to claim 9, wherein the replacing media source is one or more of audio, video and data.

13. A communication server, comprising:

an exchange unit, configured to receive and forward a first media stream sent by a terminal in a communication process;

an interoperability gateway, configured to receive the first media stream forwarded by the exchange unit;

wherein the exchange unit is further configured to receive a request for replacing the first media stream from the terminal, and send the request to the interoperability gateway; the interoperability gateway is further configured to obtain a second media stream from a multimedia server according to a replacing media source identification carried in the request for replacing the first media stream, and send the second media stream to the exchange unit;

and the exchange unit is further configured to replace the first media stream with the second media stream to obtain a replaced media stream, and send the replaced media stream to another terminals participating in the communication process;

wherein the first media stream is sent from the terminal to the other terminal before the exchange unit replaces the first media stream with the second media stream during the communication process.

14. A communication server, comprising:

an exchange unit, configured to receive a first media stream sent by a terminal in a communication process, and forward the first media stream;

an interoperability gateway, configured to receive the first media stream forwarded by the exchange unit; and a multi-point control unit, configured to receive the first media stream sent by the interoperability gateway;

wherein the exchange unit is further configured to receive a request for replacing the first media stream from the terminal and send the request to the multi-point control unit through the interoperability gateway, the multi-point control unit is further configured to determine whether the terminal has a right to replace the first media stream, obtain a second media stream from a multimedia server according to a replacing media source identification carried in the request for replacing the first media stream if the terminal has the right, replace the first media stream with the second media stream to obtain a replaced media stream, and send the replaced media stream to the exchange unit through the interoperability gateway, and the exchange unit is further configured to send the replaced media stream to all terminals participating in the communication process or the terminals participating the communication process other than the terminal issuing the request for replacing the media stream;

wherein the first media stream is sent from the terminal to the other terminal before the multi-point control unit replaces the first media stream with the second media stream during the communication process.

15. The system according to claim 9, wherein the communication process is a multi-party communication process, and the communication server comprises:

an exchange unit, configured to receive and forward the first media stream sent by the terminal, and receive and forward the request for replacing the first media stream from the terminal; and an interoperability gateway, configured to receive the first media stream forwarded by the exchange unit, receive the request for replacing the first media stream forwarded by the exchange unit, obtain the second media stream from the multimedia server according to the replacing media source identification carried in the request for replacing first the media stream, and send the second media stream to the exchange unit;

wherein the exchange unit is further configured to receive the second media stream and replace the first media stream sent by the terminal with the second media stream to obtain the replaced media stream, and send the replaced media stream to all the terminals participating in the communication process or the terminals participating the communication process other than the terminal issuing the request for replacing the first media stream.

16. The system according to claim 9, wherein the communication process is a multi-party communication process, and the communication server comprises:

a multi-point control unit, configured to receive a request for starting a media replacing service from the first terminal, determine whether the terminal sending the request has a right to replace the first media stream, request the multimedia server to provide a navigation media stream to the terminal if the terminal has the right, receive the request for replacing the first media stream from the terminal, obtain the second media stream from the multimedia server, and replace the first media stream sent by the terminal with the obtained second media stream to obtain the replaced media stream, and forward the replaced media stream;

an interoperability gateway, configured to receive the replaced media stream, convert the replaced media stream into circuit domain data, and forward the circuit domain data; and an exchange unit, configured to send the circuit domain data to all the terminals participating in the communication process or the terminals participating the communication process other than the terminal issuing the request for replacing the first media stream.

* * * * *